Figure 1:
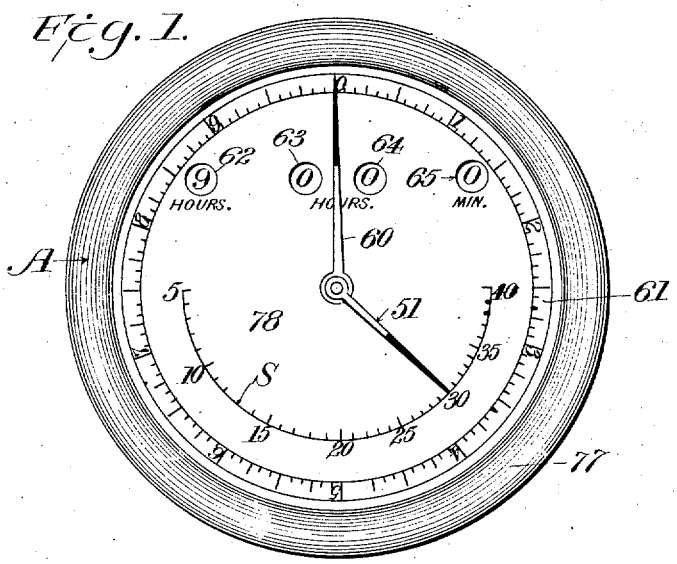

R. SHIPMAN.

SPEED INDICATOR.

APPLICATION FILED MAR. 15, 1910.

Reissued Jan. 10, 1911. 13,196.

4 SHEETS—SHEET 1.

Witnesses

C. M. Walker.

Newton P. Wellis.

Inventor

Ralph Shipman

By Robert Watson

Attorney

R. SHIPMAN.

SPEED INDICATOR.

APPLICATION FILED MAR. 15, 1910.

Reissued Jan. 10, 1911.

13,196.

4 SHEETS—SHEET 2.

Witnesses

C. M. Walker.

Newton P. Willis.

By

Ralph Shipman

Robert Watson

Attorney

Inventor

R. SHIPMAN.

SPEED INDICATOR.

APPLICATION FILED MAR. 15, 1910.

Reissued Jan. 10, 1911.

13,196.

4 SHEETS—SHEET 3.

Witnesses

C. H. Wicker.

Newton P. Willis.

Inventor

Ralph Shipman

By Robert Watson

Attorney

R. SHIPMAN.

SPEED INDICATOR,

APPLICATION FILED MAR. 15, 1910.

Reissued Jan. 10, 1911.

13,196.

4 SHEETS—SHEET 4.

Witnesses

C. H. Walker.

Newton P. Willis

Inventor

Ralph Shipman

By Robert Watson

Attorney

UNITED STATES PATENT OFFICE.

RALPH SHIPMAN, OF SUNBURY, PENNSYLVANIA.

SPEED-INDICATOR.

13,196. Specification of Reissued Letters Patent. Reissued Jan. 10, 1911.

Original No. 903,793, dated November 10, 1908, Serial No. 415,509. Application for reissue filed March 15, 1910. Serial No. 549,573.

*To all whom it may concern:*

Be it known that I, RALPH SHIPMAN, a citizen of the United States, residing at Sunbury, in the county of Northumberland and State of Pennsylvania, have invented certain new and useful Improvements in Speed-Indicators, of which the following is a specification.

My present invention relates to a speed indicator for vehicles operating upon the same principle as the indicator shown in my Patent No. 870,852 in which the average speed at which the vehicle travels for a given unit of distance is indicated by an indicator arm which remains stationary until the vehicle has traveled over the next unit of distance, when the arm shifts to indicate the average speed maintained during the latter unit, if there has been a change in the average speed; or, if the average speed remains the same while the vehicle travels over successive units of distance, the indicator arm will remain stationary.

The device is arranged to indicate in miles per hour the average speed maintained for short distances such as fifty, one hundred or two hundred feet, so that in the ordinary steady travel of the vehicle the indicator will show in miles per hour the speed of the vehicle; but if any change occurs in the average speed for such short unit of distance, the indicator arm will move to indicate the change in the speed.

In my present invention I provide means whereby the movement of the vehicle operates to wind the time mechanism, the latter being set in motion when the vehicle starts and stopping each time the vehicle stops, and in connection with the speed indicating means I also provide mechanism for indicating the total number of hours and minutes during which the vehicle may have been used altogether, and how many hours it may have been in operation in making a given trip. For instance, if the vehicle runs say one hundred miles in a day, making a number of stops during that time, as the time mechanism of my invention runs only when the vehicle is in operation the number of hours during which the vehicle is in actual operation in traveling that distance will be indicated by the mechanism which forms part of my present invention, and the total number of hours that the vehicle may be used in making any number of trips will also be indicated.

Figure 2:
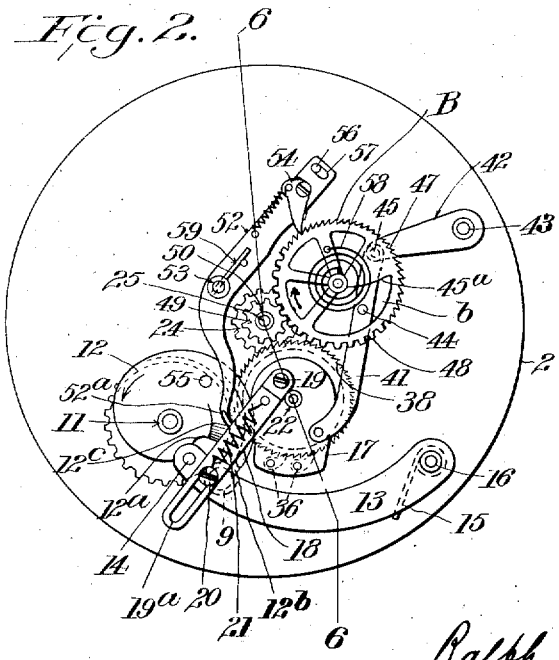
Figure 3:
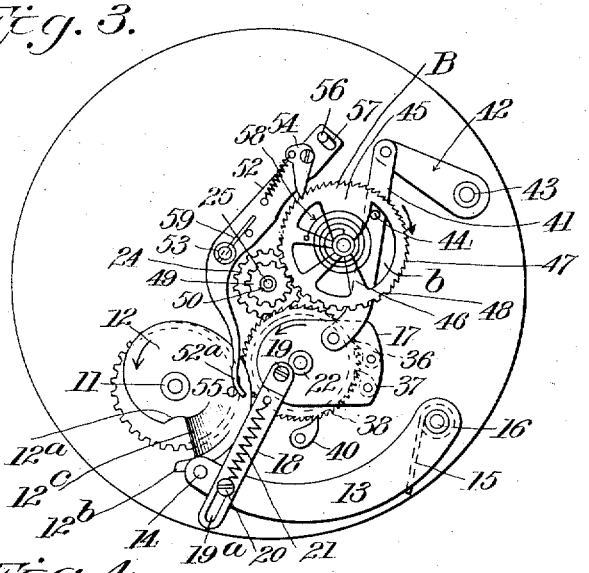
Figure 4:
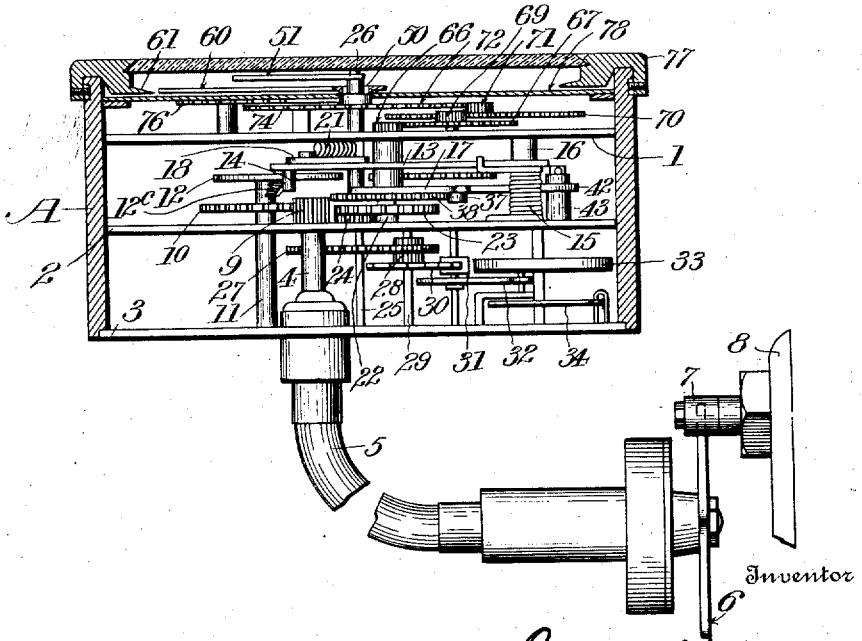
Figure 5:
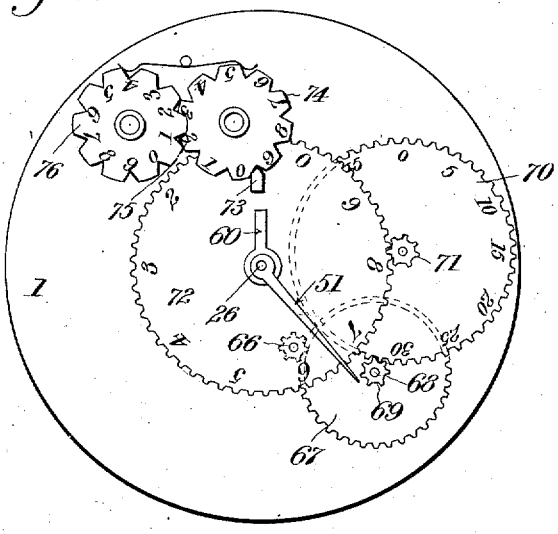
Figure 6:
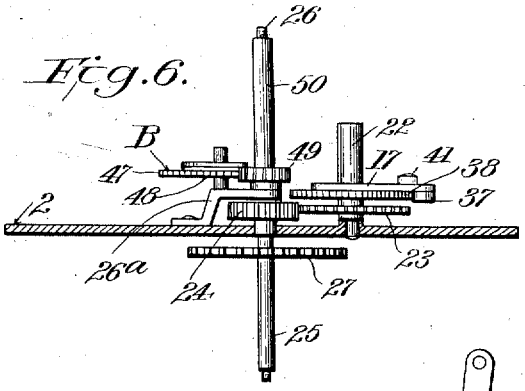
Figure 7:
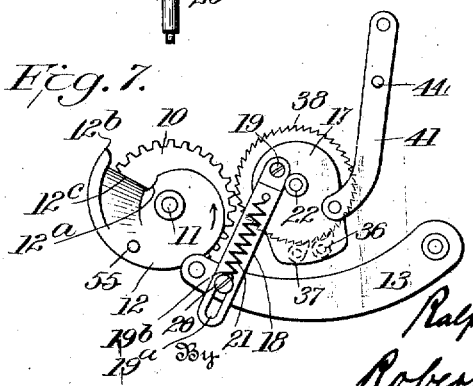
Figure 8:
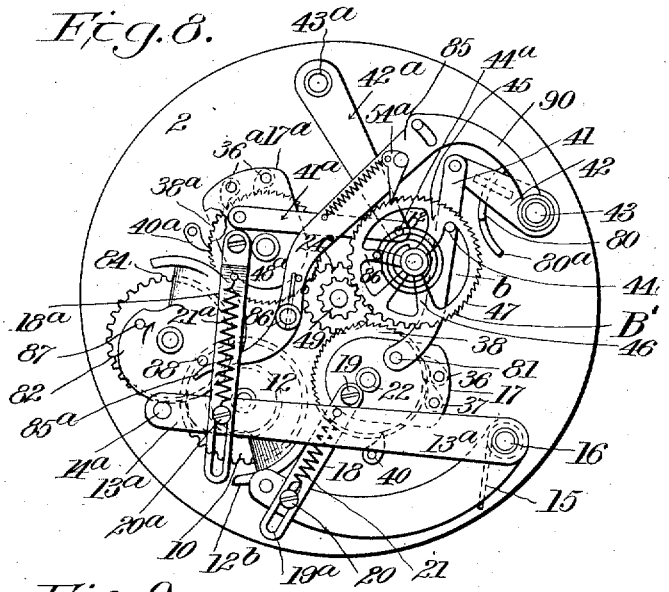
Figure 9:
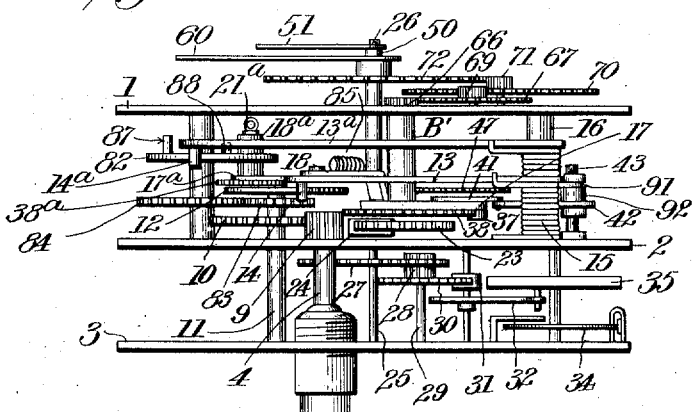
Figure 10:
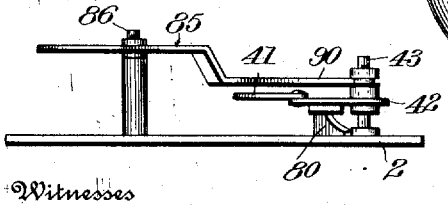
Figure 10:
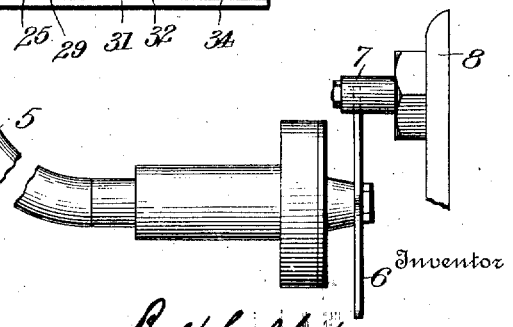

In the accompanying drawing which illustrates my invention, Figure 1 is a top plan view of the indicator; Figs. 2 and 3 are similar views of the speed indicating mechanism, the casing and the mechanism for indicating the hours during which the vehicle operates, being removed; Fig. 4 is a side view of the entire mechanism, the casing being removed; Fig. 5 is a plan view showing the mechanism for indicating the number of hours the vehicle is in operation; Fig. 6 is a section through the plate 2 of the frame on the line 6—6 of Fig. 2, some of the parts being omitted; Fig. 7 is a top plan view of the winding and resetting devices, the parts being shown in a different position from the positions of the same parts in Figs. 2 and 3; Fig. 8 is a top plan view of speed indicating mechanism embodying two cams, one for operating the mechanism when the vehicle is running at low or moderate speed, and the other for operating at high speeds; Fig. 9 is a side elevation of the mechanism shown in Fig. 8; and, Fig. 10 is a detail view looking from right to left in Fig. 9.

Referring to Figs. 1 to 7 inclusive of the drawing, A indicates a suitable casing within which the working parts of the indicator are inclosed, the latter being supported by three parallel plates 1, 2 and 3.

The speed indicating mechanism comprises a spindle 4 which is connected by a flexible shaft 5 to a star wheel 6 which is operated intermittently by a tappet 7 suitably secured to the hub 8 of a vehicle wheel. The shaft 4 carries a pinion 9 which meshes with a gear 10 upon a shaft 11 suitably supported in the plates 2 and 3. Upon the upper end of the shaft 11 is secured a snail-cam 12 adapted to give an oscillating movement to a lever 13 having a pin 14 which engages the periphery of the cam. The lever 13 is normally pressed toward the cam by a spring 15 which encircles a post 16 upon which said lever is pivoted. During each complete revolution of the gear 10 and cam 12 the lever 13 is moved from the position shown in Fig. 2, wherein the pin 14 engages the low portion 12[a] of the cam, to the position shown in Fig. 3 wherein said pin engages the tongue 12[b] which forms the highest portion of the cam, and the pin is then released from the tongue 12[b] and drops again on to the lowest portion of the cam, thus causing the lever 13 to swing back and forth about its pivot 16 each time the cam makes a complete revolution. Near the free end of the lever the latter is connected to a clutch member 17 by a link 18 which is secured to the clutch member by a pivot pin 19 and to the lever 13 by a slot and pin connection, the lever 18 having a slot 19[a] through which a stud or pin 20 on the lever extends. This slot and pin connection allows the lever to move toward and from the clutch member. A spring 21, secured to the pin 20 and to the lever 18 at a point near the clutch member serves as the main spring of the clock mechanism. The clutch member 17 is mounted upon a shaft or spindle 22 which carries a gear 23, the latter meshing with a pinion 24 upon a staff or spindle 25. This spindle 25 also carries a gear 27 which meshes with a pinion 28 upon a spindle 29 the latter having thereon an escapement wheel 30 which is controlled by the usual pallet 31, fork 32, balance wheel 33 and hair spring 34 and a suitable regulator to control the speed of the clock mechanism.

The clutch member 17 is pivoted upon the spindle 22 so that it may turn independently of the various gears and pinions in one direction, and it carries one or more pawls 36, 37 adapted to engage with a ratchet wheel 38 which is secured to said shaft 22. When said clutch member rotates in the direction of the arrow, Fig. 3, under the tension of the main spring 21, the pawls engage the ratchet wheel 38 and thereby turn the shaft 22 and the gear 24 upon said shaft, the speed of rotation of the clutch member being controlled by the balance wheel and escapement mechanism. The shaft or spindle 25, carrying the pinion 24, rotates once in a minute.

When the tongue 12[b] of the cam 12 passes the pin 14 on the lever 13, allowing the lever to move from the position shown in Fig. 3 to that shown in Fig. 2, the stud 20 on the lever strikes against the inner end 19[b] of the slot 19[a] and moves the link 18 from the position shown in Fig. 3 to that shown in Fig. 2 thereby causing the clutch member 17 to turn approximately 90° about the shaft 22, the dogs or pawls 36 and 37, during this movement, slipping over the teeth of the ratchet wheel 38. As the cam 12 continues to turn, in the direction of the arrow, the lever 13 swings outward, the stud 20 on the lever moving out toward the end of the slot 19[a] of the link 18 (as shown in Fig. 7) and the main spring 21 is thus placed under tension, and causes the clutch member 17 to rotate in the direction of the arrow. During this movement the pawls 36 and 37 are in engagement with the ratchet wheel 38 and the shaft 22 is thereby rotated, causing the gear 24 to operate the clock mechanism, which regulates the speed of the gear 24 and clutch member 17. It will be understood that the clutch member is returned to its normal position, shown in Fig. 2, each time that the cam 12 makes one revolution and the lever 13 drops from the high part of the cam to the low part, and that the main spring 21 is put under tension to operate the clock mechanism as the cam forces the lever 13 outward from its normal position.

As the cam 12 is driven by the flexible shaft 5, the cam will turn once for each unit of distance traveled by the vehicle and its speed of rotation will be proportional to the speed of the vehicle. Thus, the cam 12 may be made to rotate once while the vehicle is traveling 176 feet, and if the vehicle is traveling at the rate of say five miles per hour the cam will make one complete revolution in twenty-four seconds and this will cause the clutch member 17 to be set back to its normal position once in twenty-four seconds if the vehicle continues at the rate of five miles per hour; but if the speed increases say to ten miles per hour the cam 12 will be driven twice as fast as before and the clutch member 17 will be reset in its normal position at the end of each unit of distance traveled (176 ft.) but this resetting operation will take place twice as often as before, if the speed is maintained at ten miles per hour, or once in twelve seconds, the main spring being placed under tension to operate the clock mechanism during each revolution of the cam.

The cam is provided with an inclined face 12[c] so that when the vehicle is run backward the pin 14 may slide up on said inclined face and ride on top of the cam during each backward revolution thereof thus preventing the pin from being caught and the parts damaged. A suitable holding pawl 40 is provided for the purpose of preventing the ratchet wheel 38 from being turned by the clutch member when the latter is being reset.

A float lever 41 is pivotally connected to the clutch member 17 and to an arm or crank 42 which is pivoted upon a stud 43 on the plate 2, and this float lever carries a pin 44 which projects upward into the slot *b* between the arms 45 and 46 of a wheel B having ratchet teeth 47 extending partly around its circumference and gear teeth 48 extending around the remainder of its circumference said gear teeth meshing with a pinion 49 upon a sleeve 50 which is loosely mounted upon a stud 26, suitably supported upon the plate 2 by a foot piece 26[a], and carries the pointer or indicator arm 51. A lever 52 mounted upon a central pivot 53 carries a spring pressed pawl 54 which normally engages the teeth 47 of the wheel B, and one end 52[a] of this lever is arranged in the path of movement of a tripping pin 55 upon the cam 12, this pin being arranged to engage a shoulder 52[a] upon the lever and move the pawl 54 out of engagement with the teeth of the wheel B and permit said pawl to reëngage the teeth just before the pin 14 on the lever 13 drops from the high part of the cam to the low part. The lever 52 has a limited movement about the pivot pin 53, a spring 59 normally holding the shoulder 52[a] in the path of the tripping pin 55, and a stop 56, which extends through a slot 57 in the lever being adapted to limit the movement of the lever. A spring 58 normally tends to turn the wheel B in the direction of the arrow, but the wheel is normally prevented from turning in that direction by the pawl 54 except at the moment when said pawl is moved out of engagement with the teeth of said wheel by the tripping pin 55. The pin 44 upon the float lever 41 limits the movement of the wheel B in the direction of the arrow.

When the lever 13 drops from the high part of the cam to the low part of the cam the clutch member 17 is returned to its normal position, shown in Fig. 2, and the pin 44 upon the float lever is consequently returned to a given position each time said clutch member is reset. Then as the cam 12 rotates and the lever 13 moves outwardly the main spring 21 being put under tension causes the clutch member 17 and the clock work to operate so that the clutch member moves with the clock mechanism and the float lever is carried along by the clutch member so as to move the pin 44 toward the curved face 45[a] of the arm 45 of the wheel B. When said pin engages the arm 45 the wheel B is turned thereby in opposition to the spring 58 and the wheel is rotated causing the pinion 49 also to turn and the indicator 51 is thereby turned. If the vehicle is traveling at a low rate of speed the pin 44 may engage the arm 45 and rotate the wheel B into the position shown in Fig. 3. Then, just before the pin on the lever 13 drops on to the low part of the cam 12 the lever 52 will be rocked by the tripping pin 55 so as to release the pawl 54 from the wheel B, but the spring 58 will not be able to return the wheel B when the pawl is released from the wheel, because the pin 44 is still in engagement with the arm 45, and after the lever 13 drops on to the low part of the cam the wheel B will be held against movement by the pawl 54. The pointer or indicator 51 will then indicate a low rate of speed on the dial, which is the average speed for the distance traveled while the float lever was moving from its normal position shown in Fig. 2, to the position shown in Fig. 3. When the lever 13 drops on to the low part of the cam the clutch member 17 and float lever 44 are returned to their normal positions, shown in Fig. 2. If, during the next unit of distance traveled by the vehicle, the average speed of the vehicle should be increased, the tripping pin 55 will operate the lever 52 so as to release the holding pawl 54 from the wheel B before the pin on the float lever reaches the position shown in Fig. 3. As a consequence the spring 58 will immediately turn the wheel B so that the arm 45 will fly back against the pin 44 on the float lever which pin will stop the movement of the wheel. In moving backward the pinion 49 and the indicator arm 51 are likewise moved and as soon as the arm 45 engages the pin 44, the holding pawl 54 engages the teeth on the wheel B so as to hold the same and the lever 13 then drops from the high to the low part of the cam 12, causing the clutch member 17 and float lever to be reset in their normal positions. The indicator will then indicate the average speed maintained during the unit of distance just passed over. In the same way, if, in the next unit of distance the speed should be still further increased the tripping pin 55 will cause the lever 52 and pawl 54 to release the wheel B before the pin 44 engages the arm 45 and the wheel will turn until the arm 45 strikes against the pin 44, when the pawl 54 will lock the wheel in this new position. If now the average speed is lower during another unit of distance, the cam 12 will turn slower and the float lever will move from its normal position until the pin 44 engages the arm 45 and moves the wheel B so as to carry the pointer around to a position on the scale of the instrument corresponding to the average rate of movement of the vehicle during this period.

The scale on the dial indicating the average speed in miles per hour is indicated by the letter S on Fig. 1 and for the purpose of making the scale units approximately equal distances apart, the surface 45[a] of the arm B is preferably curved as shown, so that the movement of the wheel B by the pin 44 will be less as the pin 44 moves from its normal position.

It will be seen from the foregoing that the clock mechanism above described will be maintained in continual operation as long as the vehicle continues in motion; but when the vehicle stops, the clock mechanism stops.

In order to indicate the number of hours that the vehicle may be in actual operation during a single trip, and the total number of hours that it may be in actual operation all together in any number of trips, I provide an hour hand or pointer 60, driven by the clock mechanism and which travels over a scale 61 divided into units, from one to ten, the indicator or pointer 60 being geared to the clock work of the mechanism so that when said mechanism (and the vehicle which drives it) operates for one hour, the pointer 60 will travel the distance of one unit on the scale 61, and I provide a train of adding wheels which indicate through openings 62, 63, 64 and 65 in the dial the total number of hours that the vehicle is in actual operation. As shown in the drawing a pinion 66 secured to the shaft 22 above the plate 1 drives a gear 67 upon a shaft 68 carrying a pinion 69 which meshes with a wheel 70, which turns at the rate of one revolution per hour when the clock work is in operation. This minute wheel 70 has numerals thereon, as shown, which appear successively beneath the opening 65 in the dial plate to indicate minutes or fractions of an hour. A pinion 71 rotatable with the gear 70 meshes with a unit gear 72 which turns once for each ten revolutions of the gear 70 and carries the pointer or indicator 60. The unit gear 72 is provided with numerals reading from zero to nine, as shown, and these numerals appeal in succession through the opening 64 in the dial plate. A tappet 73 on the unit wheel 72 operates a registering wheel 74 having numerals thereon for indicating tens through the opening 63 in the dial plate and the wheel 74 carries a tappet 75 for operating a wheel 76 having numerals thereon for indicating hundreds through the opening 62 in the dial plate. It will be evident that the wheels 70, 72, 74 and 76 will indicate the total number of hours and fractions of an hour that the clock work is in operation, and as the clock work only operates when the vehicle is in motion, the indicating wheels will then show the number of hours that the vehicle is used.

In indicating the number of hours that the machine is in operation on a given trip, the rim 77 of the instrument to which the scale 61 is attached may be turned so as to bring the zero mark opposite the pointer 60 before commencing the trip. This does not disturb the dial plate 78 upon which the scale S is marked and through which the numbers on the registering wheels may be observed.

The speed indicator heretofore described is suitable for a certain moderate range of speeds and also for high speeds but for vehicles which may run at very high speeds, such as sixty or sixty-five miles per hour it is desirable to average the speed for units of distance of greater length in order that the time operated clutch member may not be reset so often as would occur with the mechanism heretofore described operating at high speed. For the higher speeds I provide two cams, driven from the vehicle by the flexible shaft, one for operating the speed indicator at low or moderate speeds of the vehicle, and the other cam, rotated at a slower speed than the first, being arranged to operate the speed indicator when the vehicle's speed increases above a certain predetermined amount, the change from one cam to the other being automatic.

In Figs. 8 and 9 of the drawing I have shown an indicator provided with two cams rotated by the flexible shaft and means whereby one cam operates the indicator at moderate speeds and the other cam operates the indicator at high speeds. In said figures the mechanism for operating at low speeds is substantially the same as in Figs. 2, 3 and 4 of the drawing and the parts are indicated by similar reference letters and need not be described again in detail. The arm 42 which is journaled on the post 43 and pivotally connected to the float lever 41, in Figs. 8 and 9 of the drawing, is movable vertically on the post 43 and slides upon a segmental support 80 which is secured to the plate 2, this segmental support having one end 80ᵃ lower than the other. The pivotal connection 81 between the float lever and the clutch member 17 is such as to permit the opposite end of the lever to move upward and downward as the arm 42 slides over the support 80, and when the arm 42 is resting upon the low portion 80ᵃ, of the support the pin 44 upon the float lever drops below the plane of the wheel B′ out of the slot *b*, which is formed between the spokes 45 and 46. When operating at slow or moderate speeds the clutch member 17 will be reset at the end of each revolution of the cam 12 and the arm 42 will move on to the low portion of the support 80, the pin 44 dropping below the plane of the wheel B′, and as the clutch member 17 is rotated by the time mechanism the arm 42 will ride up off of the low portion of the support 80 on to the high portion and raise the pin on the float into the slot *b*. At these moderate speeds the spoke 45 of the wheel B′ will always be at some distance in advance of the pin 44 when the latter is raised into the slot as the arm 42 moves over the support 80. At moderate speeds the operation will be practically the same as heretofore described. For higher speeds I provide a cam 82 which is the same as the cam 12, but arranged to operate at one-half the speed by means of a gear 83 which turns with the cam 12 and meshes with a gear 84 of double the size arranged to turn the cam 82. This cam 82 will rotate once while the vehicle is traveling twice the distance required for rotating the cam 12 once. A spring pressed lever $13^a$ has a pin $14^a$ bearing against the periphery of the cam 82 and this lever is tripped once in each revolution of said cam in the same way that the lever 13 is tripped by the cam 12. A clutch member $17^a$ is connected to the lever $13^a$ by a link $18^a$ and a main spring $21^a$ is secured to the link and to a stud $20^a$ upon the lever $13^a$. The clutch member $17^a$ has pawls $36^a$ which engage a ratchet wheel $38^a$, the latter being secured to a gear $23^a$ which meshes with the pinion 24 upon the shaft 25 which latter is geared to the escapement mechanism. A float lever $41^a$ pivoted at one end to the clutch member $17^a$ has its opposite end pivoted to an arm $42^a$ journaled upon a supporting post $43^a$. A tripping lever 85 is mounted upon a pivot pin 86 so as to be rotatable thereon within limits, and also adapted to oscillate in a vertical direction. This tripping lever carries one or more spring pawls $54^a$ for engaging the wheel B′ in the same manner and for the same purpose as the pawl 54 in the previously described figures. A pin $44^a$ on the float lever $41^a$ projects into an opening $b^2$ in the wheel B′ between the spoke 45 and a spoke 86. The slow moving cam 82 has thereon two diametrically opposite tripping pins 87 and 88, the former projecting a little higher above the plane of the cam than the latter.

The end portion $85^a$ of the tripping lever is arranged so that it is normally in the path of movement of the pins 87 and 88 so that as these pins move past the end of the lever the latter will be tripped twice in each revolution of the cam 82, which is the equivalent of tripping the lever once in each revolution of the cam 12. An arm 90 projects from the lever 85 into an annular recess 91 in the collar 92, to which the arm 42 is secured so that when said arm 42 rests upon the low portion $80^a$ of the support 80 the longer arm of the tripping lever 85 will be depressed, thus raising the end $85^a$ of said lever above the path of movement of the lower pin 88 upon the cam 82, but said end will still be in the path of movement of the high pin 87. When the arm 42 rests upon the high portion of the support 80 the longer arm of the lever 85 is raised so that the end $85^a$ of said arm will be depressed and may be engaged by both of the pins 87 and 88.

In operating at low or moderate speeds, as previously stated the arm 42 will work out on to the high part of the support 80 carrying the pin 44 into the slot $b$ and causing the end $85^a$ of the tripping lever to be within range of both of the pins 87 and 88 so that said lever will be tripped by each of said pins in succession and the pin 44 upon the float lever 41 will regulate the position of the wheel B′ and the indicator arm 51. This regulation will take place at each half revolution of the cam 82 or each complete revolution of the cam 12. But at high speeds the arm 42 will move only on the low portion $80^a$ of the support 80, and this will permit the tripping lever 85 to tilt so that the end $85^a$ of said lever will be engaged only by the pin 87. Hence in operating at high speeds the lever will be tripped only once during each revolution of the cam 82 and whenever it is tripped, as the pin 44 is below the plane of the wheel B′ and the pin $45^a$ on the float lever $41^a$ is within the slot $b^2$, the latter pin will serve as a stop for the arm 86 of the wheel B′ and thus stop the wheel at a point which will cause the pointer to indicate a point on the scale corresponding to the average speed which the vehicle has made in traveling over two units of distance. If the average speed during the next two units increases, the pin $44^a$ will not have traveled so far to the left as in Fig. 8 before the tripping action occurs, and when the lever is tripped the wheel will turn still farther to the right in Fig. 8, until the arm 86 contacts with the pin $44^a$, and the higher speed will be indicated. On the other hand if the speed decreases somewhat during the next two units, but does not fall to a low or moderate speed the pin $44^a$ will have time to travel farther to the left in Fig. 8 and carry the arm 86 around with it, thus rotating the wheel B′ in a direction to cause the pointer 51 to indicate a lower speed. As previously described, during these high speed movements the arm 42 plays back and forth on the low portion $80^a$ of the support 80 and does not rise on to the high portion of said support. If now the speed falls to a low or moderate speed the arm 42, operated by the clutch member 17 will ride on to the high portion of said support, thereby causing the tripping lever $85^a$ to tilt back into its normal position so that the end $85^a$ will be engaged by both of the pins 87 and 88, successively, and the pin upon the float lever 41 will control the movement of the wheel B′ instead of the pin upon the float lever $41^a$.

What I claim is,—

1. In a speed indicating device, a time mechanism, a clutch member adapted to engage and move said mechanism, a main spring for moving said member in one direction, means operated by the machine whose speed is to be measured for putting said spring under tension, means for releasing said spring and resetting said clutch member each time said machine moves a given distance, an indicator, and means movable with said clutch member for regulating the position of said indicator.

2. In a speed indicating device, a time mechanism, a clutch member adapted to engage and move said mechanism, a main spring for moving said member in one direction, means operated by the machine whose speed is to be measured for releasing said spring and resetting said clutch member each time said machine moves a given distance, an indicator, a spring for moving said indicator in one direction, means for locking the indicator against such movement, means movable with the clutch member for moving the indicator in the opposite direction and means for releasing the indicator in advance of the resetting operation.

3. In a speed indicating device, a time mechanism, a clutch member adapted to engage and move said mechanism, a main spring for moving said member in one direction, means operated by the machine whose speed is to be measured for releasing said spring and resetting said clutch member each time said machine moves a given distance, a rotatable ratchet device, spring pressed in one direction, a pawl for locking said ratchet device, means movable with said clutch member for moving said ratchet device in the opposite direction, means for tripping said pawl to release the ratchet device in advance of the resetting operation and an indicator movable by said ratchet device.

4. In a speed indicating device, a time mechanism, a clutch member adapted to engage and move said mechanism, a cam rotatable by the machine whose speed is to be measured, a lever movable by said cam in one direction and spring pressed in the opposite direction, a main spring connecting said clutch member with said lever, a link pivoted to said clutch member and having a lost motion connection with the lever, an indicator, and means movable with the clutch member for regulating the position of said indicator.

5. In a speed indicator device, a time mechanism, a rotatable clutch member adapted to engage and move said mechanism, a main spring connected to said clutch member, means operated by the vehicle or machine whose speed is to be measured for resetting said clutch member in an initial position each time the machine moves a given distance, an indicator, a spring for moving said indicator in one direction, a device for normally locking said indicator against movement by the latter spring, means for tripping said locking device each time the machine moves a given distance, and means movable with the clutch member for regulating the position of the indicator when the last mentioned spring is released.

6. In a speed indicator device, a clutch member and a main spring for moving said mechanism, means operated by the machine whose speed is to be measured for resetting said clutch member in an initial position each time said machine moves a given distance, a float lever connected to said clutch member and having a stop pin or projection thereon, a spring pressed ratchet wheel having an arm adapted to engage said stop, an indicator movable by said wheel, a pawl normally engaging said wheel to prevent rotation by its spring, and means for tripping said pawl each time the machine moves a given distance.

7. In a speed indicator device, a clutch member and a main spring for moving said mechanism, means operated by the machine whose speed is to be measured for resetting said clutch member in an initial position each time said machine moves a given distance, a rotary member, spring pressed in one direction, an indicator movable by said latter member, means connected with the clutch member for moving the rotary member in opposition to its spring, means for normally locking said rotary member against movement by its spring, and means for releasing said rotary member each time the machine moves a given distance and just before the clutch member is reset.

8. In a speed indicating device, a clutch member and a main spring for moving said mechanism, means operated by the machine whose speed is to be measured for resetting said clutch member in an initial position each time said machine moves a given distance, a ratchet wheel spring pressed in one direction, a pawl normally preventing the movement of said wheel by its spring, a float lever connected to said clutch member and having a stop or projection adapted to engage an arm or spoke of said wheel, an indicator, movable by said wheel, and means for releasing said pawl each time the machine moves a given distance.

9. In a speed indicating device a cam rotatable by the machine whose speed is to be measured, a device spring pressed toward said cam, a clutch member, a main spring connecting said device with said clutch member, a link pivoted to said clutch member and having a lost motion connection with said device, a clock mechanism movable by said clutch member, an indicator, means connected with said clutch member for moving the indicator in one direction, a spring for moving said indicator in the opposite direction, means for normally preventing said latter spring from moving the indicator, and means operated each time the machine moves a given distance, for releasing said latter spring.

10. In a speed indicating device, a snail cam rotated by the machine whose speed is to be measured, a clock mechanism, a rotatable clutch member for moving said mechanism, a main spring connected to said member, means operated by said cam for putting said spring under tension and for setting said clutch member in an initial position, and indicating mechanism controlled by the position of said clutch member.

11. In a speed indicating device, a time mechanism, two clutch members adapted to engage and move said mechanism, main springs for moving each of said members, devices operated at relatively different speeds by the machine whose speed is to be measured for putting said main springs under tension and then releasing the springs, means for resetting said clutch members in initial positions each time the springs are released, an indicator, devices movable with said clutch members for regulating the position of said indicator, and means whereby one of said latter devices operates to regulate the position of the indicator for a certain range of speeds and the other of said devices operates to regulate the position of the indicator for a higher range of speeds.

12. In a speed indicating device, an indicator, a rotary member spring pressed in one direction for moving said indicator, a tripping device normally preventing the movement of said rotary member by its spring, a float lever having a stop or projection adapted to move said rotary member in the opposite direction, a clock mechanism, a clutch member for moving said clock mechanism in one direction and connected to said float lever, a cam operated by the machine for setting said clutch member in an initial position each time the machine travels unit distance, means for moving said float lever out of operative position with relation to said rotary member each time said clutch member is reset, in combination with a second float lever adapted to engage said rotary member in the inoperative positions of said first mentioned float lever, a clutch member for engaging the clock mechanism and operating said second float lever, a second cam rotated at a slower speed than said first mentioned cam, means operated by said second mentioned cam for resetting said second clutch member and means for tripping said rotary member.

13. Means for indicating the speed of a machine, comprising time mechanism, a clutch member for moving said mechanism, a main spring for moving said member, means, operated by the machine whose speed is to be indicated, adapted to adjust the clutch member and to apply tension to the main spring each time the machine moves a given distance, a speed indicating member, and means movable with said clutch member for regulating the position of the speed indicating member.

14. Means for indicating the running time of a machine comprising a time indicator, time mechanism for operating the indicator, and driving means for said mechanism adapted to be operated by the machine while the latter is in motion and to stop when the machine stops, said mechanism being dependent for continued operation upon the continued operation of the machine and said driving means, whereby said mechanism operates while the machine is in motion and stops, for lack of driving force, substantially when the machine stops.

15. Means for indicating the running time of a machine, comprising a time indicator, time mechanism for operating the indicator, and means operated by the machine for driving said mechanism and controlling the same to start and stop substantially when the machine starts and stops.

16. Means for indicating the running time of a machine comprising a time indicator, time mechanism for operating the indicator, driving means for said mechanism adapted to be operated by the machine when the latter is running, and connections between said driving means and mechanism whereby the operation of the mechanism continues while the machine is running and ceases substantially when the machine stops, said connections including a main spring, or its equivalent, and devices for periodically applying tension to said spring and allowing the same to relax during fixed intervals in the travel of the machine.

17. Means for indicating the running time of a machine comprising a time indicator, time mechanism for operating the indicator, driving means for said mechanism adapted to be operated by the machine when the latter is running, and connections between said driving means and mechanism whereby the operation of the mechanism continues while the machine is running and ceases substantially when the machine stops, said connections including a main spring adapted to run down in a brief interval of time and devices for periodically restoring energy to said spring and allowing the same to relax during fixed intervals in the travel of the machine.

18. Means for indicating the running time of a machine during one or a series of operations, comprising a time indicating member, time mechanism for operating said member, a clutch device for moving said mechanism, a main spring operable for short intervals of time for moving said device, and means, operated intermittently by the machine whose running time is to be indicated, for adjusting the clutch device and applying tension to the main spring.

19. Means for indicating the running time of a machine comprising time mechanism, a clutch member for moving said mechanism, a main spring, or its equivalent, for moving said member, means operated by the machine whose time is to be indicated, adapted to adjust the clutch member and to apply tension to said main spring each time the machine moves a given distance, and a time indicator operated by said time mechanism.

20. Means for indicating the running time of a machine comprising a time indicator, time mechanism for operating the same, a clutch member adapted to engage and move said mechanism, a main spring for moving said member in one direction, means operated by the machine whose time is to be indicated for putting said spring under tension, and means for releasing said spring and resetting said clutch member each time said machine moves a given distance.

In testimony whereof I affix my signature in presence of two witnesses.

RALPH SHIPMAN.

Witnesses:
A. W. Pontius,
C. F. Shipman.